(12) United States Patent
Malinoski

(10) Patent No.: US 9,784,905 B2
(45) Date of Patent: Oct. 10, 2017

(54) OPTICAL WAVEGUIDE, METHOD OF MANUFACTURING THEREOF, AND POLYMERIC COMPOSITION

(71) Applicant: SABIC INNOVATIVE PLASTICS IP B.V., Bergen op Zoom (NL)

(72) Inventor: Jon Michael Malinoski, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 204 days.

(21) Appl. No.: 14/424,161

(22) PCT Filed: Jun. 27, 2013

(86) PCT No.: PCT/US2013/048143
§ 371 (c)(1),
(2) Date: Feb. 26, 2015

(87) PCT Pub. No.: WO2014/004801
PCT Pub. Date: Jan. 3, 2014

(65) Prior Publication Data
US 2015/0226910 A1    Aug. 13, 2015

Related U.S. Application Data

(60) Provisional application No. 61/666,393, filed on Jun. 29, 2012.

(51) Int. Cl.
| | |
|---|---|
| *C08G 63/02* | (2006.01) |
| *F21V 8/00* | (2006.01) |
| *B29D 11/00* | (2006.01) |
| *C08G 63/64* | (2006.01) |
| *C08L 69/00* | (2006.01) |
| *B29K 67/00* | (2006.01) |
| *B29K 69/00* | (2006.01) |
| *B29K 105/00* | (2006.01) |

(52) U.S. Cl.
CPC ...... *G02B 6/0065* (2013.01); *B29D 11/00663* (2013.01); *C08G 63/64* (2013.01); *C08L 69/00* (2013.01); *C08L 69/005* (2013.01); *G02B 6/004* (2013.01); *B29K 2067/04* (2013.01); *B29K 2069/00* (2013.01); *B29K 2105/0014* (2013.01); *B29K 2105/0085* (2013.01); *B29K 2995/0088* (2013.01); *C08L 2205/025* (2013.01); *G02B 6/0036* (2013.01); *G02B 6/0043* (2013.01)

(58) Field of Classification Search
CPC .................................................... G02B 6/0065
USPC ................................................ 528/271, 272
See application file for complete search history.

(56) References Cited

U.S. PATENT DOCUMENTS

| | | | |
|---|---|---|---|
| 6,436,503 B1 | 8/2002 | Cradic et al. | |
| 6,941,057 B1 * | 9/2005 | Okamoto | C08L 69/00 385/143 |
| 2003/0205065 A1 | 11/2003 | Matsuura et al. | |
| 2010/0129649 A1 | 5/2010 | Malinoski et al. | |
| 2010/0168370 A1 | 7/2010 | Hatano et al. | |
| 2011/0071261 A1 * | 3/2011 | Hoeks | C08G 63/64 525/418 |
| 2011/0170036 A1 | 7/2011 | Ishikawa et al. | |

FOREIGN PATENT DOCUMENTS

| | | |
|---|---|---|
| JP | 2001215336 A | 8/2001 |
| JP | 200766865 A | 3/2007 |

OTHER PUBLICATIONS

International Preliminary Report on Patentability and Written Opinion of the International Searching Authority for PCT/US2013/048143 dated Dec. 31, 2014, 7 pages.
International Search Report for PCT/US2013/048143 dated Sep. 24, 2013, 5 pages.

* cited by examiner

*Primary Examiner* — Terressa Boykin
(74) *Attorney, Agent, or Firm* — Cantor Colburn LLP

(57) ABSTRACT

An optical waveguide includes a textured light-diffracting layer. The optical waveguide is made from a poly(aliphatic ester)-polycarbonate copolymer having very high flow properties and good impact properties. A method of manufacturing the waveguide by injection molding, a method of incorporating a microprism structure and a method of scattering light by directing light through a light-scattering layer thereby produced on the waveguide are also disclosed.

37 Claims, 1 Drawing Sheet

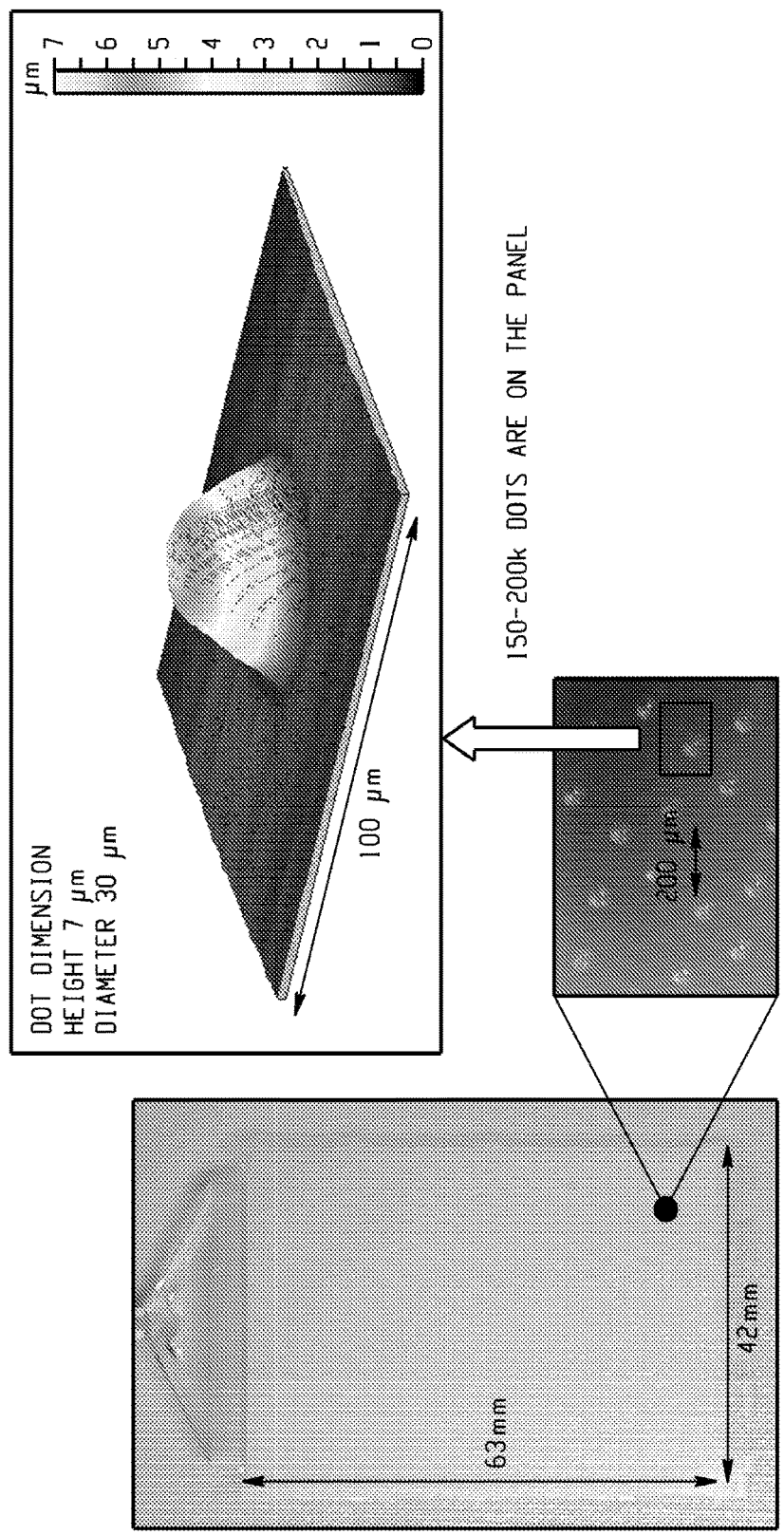

OPTICAL WAVEGUIDE, METHOD OF MANUFACTURING THEREOF, AND POLYMERIC COMPOSITION

This application is a national stage application of PCT/US2013/048143 filed on Jun. 27, 2013, which claims priority to U.S. Provisional Application Ser. No. 61/666,393 filed on Jun. 29, 2012, both of which are hereby incorporated by reference in their entirety.

BACKGROUND

The present disclosure relates to optical waveguides, such as light guide panels/plates, and polycarbonate compositions especially suitable for such waveguides. Also disclosed herein are methods for preparing and/or using the same.

Optical waveguides, also known as light guide panels or plates, generally have a rectangular shape. They are designed to diffuse, scatter, or re-direct visible light from the edges of the panel so that the light is emitted uniformly from the surface of the panel. This light diffraction is often accomplished by creating small microstructures on the surface of the panel. For example, large liquid crystal displays (LCD) such as televisions or computer monitor screens typically incorporate light guide panels. For smaller LCDs such as those found in portable electronic devices or mobile devices, the light guide panels are often made via an injection molding process. The textured surface of such small light guide panels can be generated by pattern transfer from a textured surface of the injection mold. For example, the dimensions for such small optical waveguides can be 63 mm×32 mm×0.45 mm thickness.

From a design perspective, the industry trend is moving towards producing larger optical waveguides that are increasingly thin. Recent designs for mobile devices aim for slimness, with thinner walls and with wide and large display panels. This increases design flexibility and reduces the thickness of the overall device.

It would be desirable to identify compositions which are useful for producing such devices.

BRIEF DESCRIPTION

Disclosed herein are optical waveguides made using certain specified poly(aliphatic ester)-polycarbonate copolymers. These copolymers have an extremely high flow rate which increases their suitability for producing injection-molded parts with thin walls. They also have high optical light transmission and clarity, low color, ductility, and good impact properties.

Disclosed in some embodiments is an optical waveguide, comprising: a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min.

The poly(aliphatic ester)-polycarbonate copolymer may contain about 6.0 mol % of aliphatic ester units derived from sebacic acid. The poly(aliphatic ester)-polycarbonate copolymer may have a weight average molecular weight of from about 16,000 to about 18,000. The poly(aliphatic ester)-polycarbonate copolymer may have a glass transition temperature of from 110° C. to 145° C.

The optical waveguide may have a notched Izod impact strength of at least 550 J/m when measured according to ASTM D256 at 23° C. The optical waveguide may have a ductility of 100% when measured according to ASTM D256 at 23° C. The optical waveguide may have an impact energy at peak of at least 50 J, when measured according to ASTM D3763 at 23° C. The optical waveguide may have a wall thickness of less than 0.5 mm, or less than 0.3 mm. The optical waveguide may have at least 85% light transmission when measured according to ASTM D1003 at 3.2 mm thickness. The optical waveguide may have less than 1% haze when measured according to ASTM D1003 at 3.2 mm thickness.

The poly(aliphatic ester)-polycarbonate copolymer may contain about 6 mol % of aliphatic ester units derived from sebacic acid and polycarbonate units derived from bisphenol-A.

The optical waveguide may include a textured light-diffracting layer (i.e. a light-scattering layer). The textured light-diffracting layer may be formed by injection molding of the poly(aliphatic ester)-polycarbonate copolymer using a textured mold. The textured light-diffracting layer may be formed from microdots. The textured light-diffracting layer may have a thickness of less than 10 microns.

In some embodiments, the optical waveguide has a melt flow rate measured according to ASTM D1238 (300° C., 1.2 kgf) of at least 100 g/10 min; a notched Izod impact strength of at least 550 J/m when measured according to ASTM D256 at 23° C.; and at least 85% light transmission when measured according to ASTM D1003 at 3.2 mm thickness.

In other embodiments, the optical waveguide has a melt flow rate measured according to ASTM D1238 (300° C., 1.2 kgf) of at least 100 g/10 min; a notched Izod impact strength of at least 570 J/m when measured according to ASTM D256 at 23° C.; at least 85% light transmission when measured according to ASTM D1003 at 3.2 mm thickness; and an impact energy at peak of at least 50 J, when measured according to ASTM D3763 at 23° C.

In yet other embodiments, the optical waveguide has a glass transition temperature of from 110° C. to 145° C. and a weight average molecular weight of from about 16,000 to about 18,000.

Also disclosed in various embodiments is an optical waveguide, comprising: a poly(aliphatic ester)-polycarbonate copolymer having a weight average molecular weight of from about 15,000 to about 25,000; a melt flow rate measured according to ASTM D1238 (300° C., 1.2 kgf) of at least 100 g/10 min; a notched Izod impact strength of at least 570 J/m when measured according to ASTM D256 at 23° C.; and an impact energy at peak of at least 50 J, when measured according to ASTM D3763 at 23° C.; wherein a surface of the optical waveguide includes a textured light-diffracting layer having a thickness of less than 10 microns.

The poly(aliphatic ester)-polycarbonate copolymer may have a weight average molecular weight of from about 16,000 to about 18,000. The poly(aliphatic ester)-polycarbonate copolymer may have a glass transition temperature of from 110° C. to 145° C.

In some embodiments here, a method of making an optical waveguide is disclosed, comprising: injecting a poly(aliphatic ester)-polycarbonate copolymer into an injection mold, wherein the poly(aliphatic ester)-polycarbonate copolymer has a weight average molecular weight of from about 15,000 to about 25,000 and a melt flow rate measured according to ASTM D1238 (300° C., 1.2 kgf) of at least 100 g/10 min, and wherein the injection mold includes a textured surface on an interior surface; and curing the copolymer to form an optical waveguide with a textured light-diffracting layer; and removing the optical waveguide from the injection mold.

The copolymer in the optical waveguide may have a weight average molecular weight of about 17,000 during the injection. The weight average molecular weight of the copolymer in the optical waveguide can be controlled by chain-chopping prior to injection into the injecting mold. The chain-chopping may be performed by treating the copolymer with a redistribution catalyst. The redistribution catalyst can be a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination thereof, wherein each alkyl independently contains 1 to 6 carbon atoms. In specific embodiments, the redistribution catalyst is tetra-n-butylphosphonium hydroxide. The redistribution catalyst may be used in the amount of 400 ppm by weight or less based on the weight of the poly(aliphatic ester)-polycarbonate copolymer.

Also disclosed in embodiments is a polymeric composition comprising a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min.

The poly(aliphatic ester)-polycarbonate copolymer may have a weight average molecular weight of from about 16,000 to about 18,000. The poly(aliphatic ester)-polycarbonate copolymer may have a glass transition temperature of from 110° C. to 145° C. The poly(aliphatic ester)-polycarbonate copolymer may contain about 6.0 mol % of aliphatic ester units. The aliphatic ester units may be derived from sebacic acid. The aliphatic ester units of the copolymer may have a length of from 8 to 12 carbon atoms. The poly (aliphatic ester)-polycarbonate copolymer may contain about 6 mol % of aliphatic ester units derived from sebacic acid and polycarbonate units derived from bisphenol-A. The composition may further comprise a polycarbonate polymer. The composition may alternatively further comprise a hydrolytic stabilizer.

Disclosed in embodiments herein is an optical waveguide, comprising: a poly(aliphatic ester)-polycarbonate copolymer having a weight average molecular weight of from about 15,000 to about 25,000, the weight average molecular weight being controlled by chain-chopping chemistry.

The copolymer may have a melt flow rate measured according to ASTM D1238 (300° C., 1.2 kgf) of at least 100 g/10 min. The optical waveguide may have a wall thickness of less than 0.5 mm, or of less than 0.3 mm. The poly (aliphatic ester)-polycarbonate copolymer may have a weight average molecular weight of from about 16,000 to about 18,000. The poly(aliphatic ester)-polycarbonate copolymer may have a glass transition temperature of from 110° C. to 145° C. The poly(aliphatic ester)-polycarbonate copolymer may contain about 6.0 mol % of aliphatic ester units. The aliphatic ester units can be derived from sebacic acid. The aliphatic ester units of the copolymer may have a length of from 8 to 12 carbon atoms. The poly(aliphatic ester)-polycarbonate copolymer may contain about 6 mol % of aliphatic ester units derived from sebacic acid and contains polycarbonate units derived from bisphenol-A.

Also disclosed in embodiments herein is an optical waveguide having a wall thickness of less than 0.3 mm. The optical waveguide may comprise a poly(aliphatic ester)-polycarbonate copolymer having a weight average molecular weight of from about 15,000 to about 25,000, The poly(aliphatic ester)-polycarbonate copolymer can have a weight average molecular weight of from about 16,000 to about 18,000. The poly(aliphatic ester)-polycarbonate copolymer can have a glass transition temperature of from 110° C. to 145° C. The copolymer may have a melt flow rate measured according to ASTM D1238 (300° C., 1.2 kgf) of at least 100 g/10 min. The poly(aliphatic ester)-polycarbonate copolymer may contain about 6.0 mol % of aliphatic ester units. The aliphatic ester units may be derived from sebacic acid. The aliphatic ester units of the copolymer may have a length of from 8 to 12 carbon atoms. The poly (aliphatic ester)-polycarbonate copolymer may contain about 6 mol % of aliphatic ester units derived from sebacic acid and contain polycarbonate units derived from bisphenol-A.

In specific embodiments, the optical waveguides/polymeric compositions described above do not contain an acrylic resin.

A device comprising any optical waveguide as described above is also disclosed. The device may be a liquid crystal display, a television, or a computer monitor screen.

These and other non-limiting characteristics are more particularly described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

FIG. 1 illustrates some aspects of an injection molded optical waveguide.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. Aromatic groups may be substituted or unsubstituted. Exemplary aromatic groups include, but are not limited to, phenyl, pyridyl, furanyl, thienyl, naphthyl and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group (C$_6$H$_{11}$CH$_2$—) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, —NO$_2$, —COOH, etc.

For thin yet large part designs of mobile devices, a high-impact material is needed to both support the body and the display panel throughout its lifetime. High ductility and good flow properties reflect how easily the polymeric composition can be poured into a mold for forming the shape of the part. Good flow properties can also aid in manufacturing by reducing in-mold stress which can lead to cracking. Cracking of the molded parts reduces the overall yield rate of production. In particular, standard polycarbonates are prone to brittle failure during the part injection step of injection molding.

The present disclosure generally relates to polycarbonate copolymers which exhibit a balance of high flow properties, high optical light transmission and clarity, low color, high ductility, and good impact properties. These properties enable the copolymer product to be uniquely fitted for optical waveguide applications with parts having a wall thickness of less than 0.5 mm, or even less than 0.3 mm. Such materials also demonstrate improved surface replication of the light-diffusing microstructures for optical waveguides, resulting in increased flexibility and surface structure design. The polycarbonate copolymers of the present disclosure are poly(aliphatic ester)-polycarbonate copolymers having specified properties.

As used herein, the terms "polycarbonate" and "polycarbonate polymer" mean compositions having repeating structural carbonate units of the formula (1):

(1)

in which at least about 60 percent of the total number of R$^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each R$^1$ is an aromatic organic radical, for example a radical of the formula (2):

(2)

wherein each of A$^1$ and A$^2$ is a monocyclic divalent aryl radical and Y$^1$ is a bridging radical having one or two atoms that separate A$^1$ from A$^2$. In an exemplary embodiment, one atom separates A$^1$ from A$^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

  (3)

wherein $Y^1$, $A^1$ and $A^2$ are as described above. Also included are bisphenol compounds of general formula (4):

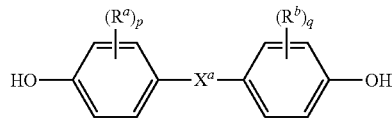  (4)

wherein $R^a$ and $R^b$ each represent a halogen atom or a monovalent hydrocarbon group and may be the same or different; p and q are each independently integers of 0 to 4; and $X^a$ represents one of the groups of formula (5):

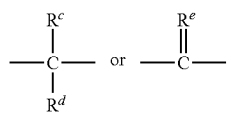  (5)

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used.

Other useful dihydroxy compounds include aromatic dihydroxy compounds of formula (6):

  (6)

wherein each $R^k$ is independently a $C_{1-10}$ hydrocarbon group, and n is 0 to 4. The halogen is usually bromine. Examples of compounds that may be represented by the formula (6) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Polycarbonates may be branched. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

In specific embodiments, the dihydroxy compound used to form the polycarbonate has the structure of Formula (I):

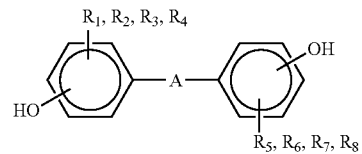  Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —$SO_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The poly(aliphatic ester) unit may have the structure of Formula (II):

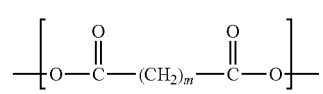  Formula (II)

wherein m is from about 4 to about 18. In particular embodiments, m is from about 8 to about 12. The ester units may be derived from a $C_6$-$C_{20}$ aliphatic dicarboxylic acid (which includes the terminal carboxylate groups) or a reactive derivative thereof, including a $C_8$-$C_{12}$ aliphatic dicarboxylic acid. In some embodiments, the terminal carboxylate groups are derived from the corresponding dicarboxylic acid or reactive derivative thereof, such as the acid halide (specifically, the acid chloride), an ester, or the like. Exemplary dicarboxylic acids (from which the corresponding acid chlorides may be derived) include $C_6$ dicarboxylic acids such as hexanedioic acid (also referred to as adipic acid); $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_6$-$C_{20}$ range may be used.

The poly(aliphatic ester)-polycarbonate copolymer is made up of a combination of carbonate units (e.g. derived from dihydroxy compounds) and aliphatic ester units (e.g. derived from aliphatic dicarboxylic acids). The molar ratio of ester units to carbonate units can vary widely, for example from 1:99 to 99:1, or more specifically from 25:75 to 75:25, depending on the desired properties of the final compositions.

A specific embodiment of the poly(aliphatic ester)-polycarbonate copolymer having ester units comprising a straight chain polymethylene group and a polycarbonate group is shown in Formula (III):

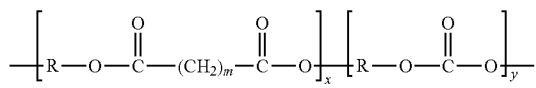

Formula (III)

where m is from 8 to 12; x and y represent average molar percentages of the aliphatic ester units and the carbonate units in the copolymer. The average molar percentage ratio x:y may be from about 13:87 to about 2:98, including from about 9:91 to about 2:98 or from 7:93 to 4:96. Each R may be independently derived from a dihydroxy compound. In specific exemplary embodiments, a useful poly(aliphatic ester)-polycarbonate copolymer comprises sebacic acid ester units (m=8) and bisphenol A carbonate units, and the average molar ratio of x:y is about 6:94. Such poly(aliphatic ester)-polycarbonate copolymers are commercially available as LEXAN HFD copolymers (LEXAN is a trademark of SABIC Innovative Plastics IP B.V.).

The poly(aliphatic ester)-polycarbonate copolymer may contain additional monomers if desired. Such polycarbonate copolymers can be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

For most applications, it is believed that the poly(aliphatic ester)-polycarbonate copolymer/optical waveguide should have a glass transition temperature (Tg) of at least 90° C. In further embodiments, the poly(aliphatic ester)-polycarbonate copolymer may have a glass transition temperature (Tg) of 110° C. to 145° C., including from 120° C. to 145° C., or more specifically from 130° C. to 139° C., or of greater than 130° C., or of greater than 132° C. Generally, for a given molecular weight, the Tg of the copolymer decreases as the aliphatic ester content (in mole percentage) increases.

The poly(aliphatic ester)-polycarbonate copolymer may have a weight average molecular weight of from about 15,000 to about 25,000, including from about 16,000 to about 18,000 (based on polycarbonate standards). It should be noted that reactive chain-chopping chemistry can be used during the extrusion process of molding the copolymer into an article to reduce the weight average molecular weight of the copolymer. This range can apply to both the starting copolymer (i.e. as an ingredient) and to the final copolymer (i.e. present in the molded article).

The poly(aliphatic ester)-polycarbonate copolymers of the present disclosure have an extremely high melt flow rate (MFR) of at least 100 g/10 minutes when measured according to ASTM D1238 at 300° C. and a 1.2 kg load. This permits the copolymer to flow easily into an injection mold. It should be noted that the MFR is heavily dependent on the temperature, and there is a large difference between the MFR measured at, e.g. 250° C. compared to 300° C. for the same copolymer.

The poly(aliphatic ester)-polycarbonate copolymers of the present disclosure may exhibit a notched Izod impact strength (NII) measured according to ASTM D256 of at least 550 J/m, when measured at 23° C., 5 lbf, and 3.2 mm thickness. In some embodiments, the notched Izod impact strength of the copolymer is at least 570 J/m, including at least 580 J/m or at least 590 J/m.

The ductility of the poly(aliphatic ester)-polycarbonate copolymers is also measured according to ASTM D256 at 23° C., 5 lbf, and 3.2 mm thickness. The ductility of the copolymers of the present disclosure is at least 80%. In embodiments, the ductility may also be 100%.

The poly(aliphatic ester)-polycarbonate copolymers also exhibit good multiaxial impact properties. They can absorb an impact energy at peak of at least 50 J, when measured according to ASTM D3763 at 23° C. In embodiments, the impact energy at peak may also be at least 60 J. This test can also be described as a falling weight impact strength test.

The poly(aliphatic ester)-polycarbonate copolymers of the present disclosure may have a light transmittance of at least 85%, when measured according to ASTM D1003 at 3.2 mm thickness. In other embodiments, the % light transmission (% LT) may be at least 89%. The haze may be less than 5%, or less than 1%, also when measured according to ASTM D1003 at 3.2 mm thickness.

The poly(aliphatic ester)-polycarbonate copolymers of the present disclosure may have any combination of these properties (MFR, NII, ductility, impact energy at peak, % LT, haze) and any combination of the listed values for these properties. It should be noted that some of the properties (e.g. NII) are measured using articles made from the polycarbonate composition; however, such properties are described as belonging to the polycarbonate composition for ease of reference.

In particular embodiments, the poly(aliphatic ester)-polycarbonate copolymers of the present disclosure have an MFR of at least 100 g/10 min and a NII of at least 550 J/m.

In some embodiments, the poly(aliphatic ester)-polycarbonate copolymers of the present disclosure have an MFR of at least 100 g/10 min and a ductility of 100%.

In other embodiments, the poly(aliphatic ester)-polycarbonate copolymers of the present disclosure have an MFR of at least 100 g/10 min and a % LT of at least 85.

In still other embodiments, the poly(aliphatic ester)-polycarbonate copolymers of the present disclosure have an MFR of at least 100 g/10 min and a haze of less than 1%.

In some desirable embodiments, the poly(aliphatic ester)-polycarbonate copolymers of the present disclosure have an MFR of at least 100 g/10 min; a NII of at least 550 J/m; and a % LT of at least 85.

In other embodiments, the poly(aliphatic ester)-polycarbonate copolymers of the present disclosure have an MFR of at least 100 g/10 min; a NII of at least 570 J/m; a % LT of at least 85; and an impact energy at peak of at least 50 J.

Other additives ordinarily incorporated in polycarbonate compositions of this type can also be used, with the proviso that the additives are selected so as to not significantly adversely affect the desired properties of the polycarbonate. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, colorants, gamma-stabilizing agents, and hydrolytic stabilizers.

Exemplary antioxidant additives include, for example, organophosphites such as tris(nonyl phenyl)phosphite, tris (2,4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Colorants such as pigment and/or dye additives can also be present in order to offset any color that may be present in the polycarbonate resin and to provide desired color to the customer. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. In particular, the titanium dioxide may be uncoated or coated with an inorganic coating (e.g. alumina) or an organic coating (e.g. polysiloxane). Pigments are generally used in amounts of 0.01 to 10 wt % of the overall polycarbonate composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly (C2-8) olefin dyes; carbocyanine dyes;

indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR^4HOH$ or —$CR^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt % of the overall polycarbonate composition.

Hydrolytic stabilizers are used to increase the stability of the copolymer. Exemplary hydrolytic stabilizers include those that have an epoxy group, such as epoxidized fatty acid alkyl esters or epoxidized fatty acid glycerides. Chain extenders can also improve the hydrolytic stability, such as those offered under the name JONCRYL (by BASF). Hydrolytic stabilizers are typically used in amounts of 0.1 to 10 wt % of the overall polycarbonate composition.

In particular embodiments, the optical waveguides/polymeric compositions of the present disclosure do not contain an acrylic resin. An acrylic resin contains an acrylic acid, acrylate, or acrylonitrile monomer, and includes copolymers or homopolymers. An exemplary acrylic resin is polymethyl methacrylate (PMMA). Acrylic resins have poor mechanical strength and poor heat resistance. Put another way, in embodiments, the polymeric portions of the optical waveguides/polymeric compositions consist essentially of the poly(aliphatic ester)-polycarbonate copolymer and the optional polycarbonate polymer. In other embodiments, the optical waveguides/polymeric compositions further include a second polycarbonate polymer that is not a poly(aliphatic ester)-polycarbonate copolymer.

The optical waveguides of the present disclosure are molded from polymeric compositions containing the poly(aliphatic ester)-polycarbonate copolymers. This can be accomplished by a variety of means such as injection molding, overmolding, extrusion, rotational molding, blow molding and thermoforming to form various molded articles. The present disclosure further contemplates additional fabrication operations such as, but not limited to, molding, in-mold decoration, baking in a paint oven, lamination, and/or thermoforming. The poly(aliphatic ester)-polycarbonate copolymers are especially useful for making optical waveguides with walls that have a thickness of less than 0.5 mm or less than 0.3 mm. Tabular moldings (i.e. a tablet-shaped article) are contemplated as being made using injection molding processes.

FIG. 1 illustrates some aspects of an injection molded optical waveguide, here a light guide panel. The panel is rectangular, with a length of 63 mm and a width of 42 mm, and a thickness of 0.45 mm. The panel contains about 150,000 to 200,000 microdots. As seen in the magnified view, each microdot has a height of about 7 microns and a diameter of about 30 microns. The microdots form a textured light-diffracting layer on one planar surface of the optical waveguide (either the front or the back surface). The microdots/textured layer can be formed using a textured mold into which the poly(aliphatic ester)-polycarbonate copolymer is injected. Alternatively, the texture can be printed on the surface of the panel/tabular molding, or transferred using a stamper. The copolymers are not prone to brittle failure. The textured layer cam have a microprism structure, such as a regular tetrahedral structure. The height of the microprism structure can be between 10 μm and 300 μm.

Again, reactive chain-chopping chemistry can be used during the extrusion process to reduce the weight average molecular weight of the copolymer when the molecular of an otherwise compositionally suitable poly(aliphatic ester)-polycarbonate is not suitably low. The final weight average molecular weight of the poly(aliphatic ester)-polycarbonate copolymer should also be within the range of from about 16,000 to about 18,000. Chain-chopping chemistry involves treatment of the copolymer with a redistribution catalyst during the extrusion step. This catalyst initiates reaction of the BPA-carbonate or BPA-sebacic acid ester linkage with water, leading to a chain-chopping mechanism and subsequent loss of polymer molecular weight. This extruded polymer is injected into the injection mold to form the molded product. The final molecular weight of the product can be varied based on the loading of the redistribution catalyst.

During reactive extrusion, the redistribution catalyst is typically included in small amounts of less than or equal to 400 ppm by weight of the polymer, including less than or equal to 300 ppm (i.e. 0.03 pph), by injecting a dilute aqueous solution of the redistribution catalyst into the extruder being fed with the poly(aliphatic ester)-polycarbonate.

In embodiments, the redistribution catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination comprising at least one of the foregoing catalysts, wherein each alkyl independently contains 1 to 6 carbon atoms. In specific embodiments, the redistribution catalyst is a tetra $C_{1-6}$ alkylphosphonium hydroxide, $C_{1-6}$ alkyl phosphonium phenoxide, or a combination comprising one or more of the foregoing catalysts. An exemplary redistribution catalyst is tetra-n-butylphosphonium hydroxide (TBPH).

In embodiments, the redistribution catalyst is present in an amount of 40 to 300 ppm by weight based on the weight of the poly(aliphatic ester)-polycarbonate.

Set forth below are some embodiments of the optical wave guide, device, and methods disclosed herein.

Embodiment 1: An optical waveguide, comprising: a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min.

Embodiment 2: The optical waveguide of Embodiment 1, wherein the poly(aliphatic ester)-polycarbonate copolymer contains about 6.0 mol % of aliphatic ester units derived from sebacic acid.

Embodiment 3: The optical waveguide of any of Embodiments 1-2, wherein the poly(aliphatic ester)-polycarbonate copolymer has a weight average molecular weight of from about 16,000 to about 18,000.

Embodiment 4: The optical waveguide of any of Embodiments 1-3, wherein the poly(aliphatic ester)-polycarbonate copolymer has a glass transition temperature of greater than 130° C. or between 110° C. and 145° C.

Embodiment 5: The optical waveguide of any of Embodiments 1-4, wherein the optical waveguide has a notched Izod impact strength of at least 550 J/m when measured according to ASTM D256 at 23° C.

Embodiment 6: The optical waveguide of any of Embodiments 1-5, wherein the optical waveguide has a ductility of 100% when measured according to ASTM D256 at 23° C.

Embodiment 7: The optical waveguide of any of Embodiments 1-6, wherein the optical waveguide has an impact energy at peak of at least 50 J, when measured according to ASTM D3763 at 23° C.

Embodiment 8: The optical waveguide of any of Embodiments 1-7, wherein the optical waveguide has a wall thickness of less than 0.5 mm.

Embodiment 9: The optical waveguide of any of Embodiments 1-7, wherein the optical waveguide has a wall thickness of less than 0.3 mm.

Embodiment 10: The optical waveguide of any of Embodiments 1-9, wherein the optical waveguide has at least 85% light transmission when measured according to ASTM D1003 at 3.2 mm thickness.

Embodiment 11: The optical waveguide of any of Embodiments 1-10, wherein the optical waveguide has less than 1% haze when measured according to ASTM D1003 at 3.2 mm thickness.

Embodiment 12: The optical waveguide of any of Embodiments 1-11, wherein the poly(aliphatic ester)-polycarbonate copolymer contains about 6 mol % of aliphatic ester units derived from sebacic acid and contains polycarbonate units derived from bisphenol-A.

Embodiment 13: The optical waveguide of any of Embodiments 1-12, wherein the optical waveguide includes a textured light-diffracting layer.

Embodiment 14: The optical waveguide of Embodiment 13, wherein the textured light-diffracting layer is formed by injection molding of the poly(aliphatic ester)-polycarbonate copolymer using a textured mold.

Embodiment 15: The optical waveguide of Embodiment 13, wherein the textured light-diffracting layer is formed from microdots.

Embodiment 16: The optical waveguide of any of Embodiments 13-15, wherein the textured light-diffracting layer has a thickness of less than 10 microns.

Embodiment 17: The optical waveguide of any of Embodiments 1-16, wherein the optical waveguide has a melt flow rate measured according to ASTM D1238 (300° C., 1.2 kgf) of at least 100 g/10 min; a notched Izod impact strength of at least 550 J/m when measured according to ASTM D256 at 23° C.; and at least 85% light transmission when measured according to ASTM D1003 at 3.2 mm thickness.

Embodiment 18: The optical waveguide of any of Embodiments 1-16, wherein the optical waveguide has a melt flow rate measured according to ASTM D1238 (300° C., 1.2 kgf) of at least 100 g/10 min; a notched Izod impact strength of at least 570 J/m when measured according to ASTM D256 at 23° C.; at least 85% light transmission when measured according to ASTM D1003 at 3.2 mm thickness; and an impact energy at peak of at least 50 J, when measured according to ASTM D3763 at 23° C.

Embodiment 19: The optical waveguide of any of Embodiments 1-18, wherein the optical waveguide has a glass transition temperature of greater than 130° C. and a weight average molecular weight of from about 16,000 to about 18,000.

Embodiment 20: A device comprising the optical waveguide of any of Embodiments 1-19 and Embodiment 93.

Embodiment 21: The device of Embodiment 20, wherein the device is a liquid crystal display, a television, or a computer monitor screen.

Embodiment 22: An optical waveguide, comprising: a poly(aliphatic ester)-polycarbonate copolymer having a weight average molecular weight of from about 15,000 to about 25,000; a melt flow rate measured according to ASTM D1238 (300° C., 1.2 kgf) of at least 100 g/10 min; a notched Izod impact strength of at least 570 J/m when measured according to ASTM D256 at 23° C.; and an impact energy at peak of at least 50 J, when measured according to ASTM D3763 at 23° C.; wherein a surface of the optical waveguide includes a textured light-diffracting layer having a thickness of less than 10 microns.

Embodiment 23: The optical waveguide of Embodiment 22, wherein the poly(aliphatic ester)-polycarbonate copolymer has a weight average molecular weight of from about 16,000 to about 18,000.

Embodiment 24: The optical waveguide of any of Embodiments 22-23, wherein the poly(aliphatic ester)-polycarbonate copolymer has a glass transition temperature of at least 130° C.

Embodiment 25: A device comprising the optical waveguide of any of Embodiments 22-24 and Embodiments 94-95.

Embodiment 26: The device of Embodiment 25, wherein the device is a liquid crystal display, a television, or a computer monitor screen.

Embodiment 27: A method of making an optical waveguide, comprising: injecting a poly(aliphatic ester)-polycarbonate copolymer into an injection mold, wherein the poly(aliphatic ester)-polycarbonate copolymer has a weight average molecular weight of from about 15,000 to about 25,000 and a melt flow rate measured according to ASTM D1238 (300° C., 1.2 kgf) of at least 100 g/10 min, and wherein the injection mold includes a textured surface on an interior surface; and curing the copolymer in the injection mold to form an optical waveguide with a textured light-diffracting layer derived from the textured surface; and removing the optical waveguide from the injection mold.

Embodiment 28: The method of Embodiment 27, wherein the copolymer in the optical waveguide has a weight average molecular weight of about 17,000 during the injection.

Embodiment 29: The method of any of Embodiments 27-28, wherein the weight average molecular weight of the copolymer in the optical waveguide is controlled by chain-chopping prior to injection into the injecting mold.

Embodiment 30: The method of Embodiment 29, wherein the chain-chopping is performed by treating the copolymer with a redistribution catalyst.

Embodiment 31: The method of Embodiment 30, wherein the redistribution catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination thereof, wherein each alkyl independently contains 1 to 6 carbon atoms.

Embodiment 32: The method of Embodiment 31, wherein the redistribution catalyst is tetra-n-butylphosphonium hydroxide.

Embodiment 33: The method of any of Embodiments 30-32, wherein the redistribution catalyst is used in the amount of 400 ppm by weight or less based on the weight of the poly(aliphatic ester)-polycarbonate copolymer.

Embodiment 34: A polymeric composition comprising a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min.

Embodiment 35: The composition of Embodiment 34, wherein the poly(aliphatic ester)-polycarbonate copolymer has a weight average molecular weight of from about 16,000 to about 18,000.

Embodiment 36: The composition of any of Embodiments 34-35, wherein the poly(aliphatic ester)-polycarbonate copolymer has a glass transition temperature of greater than 130° C.

Embodiment 37: The composition of any of Embodiments 34-36, wherein the poly(aliphatic ester)-polycarbonate copolymer contains about 6.0 mol % of aliphatic ester units.

Embodiment 38: The composition of Embodiment 37, wherein the aliphatic ester units are derived from sebacic acid.

Embodiment 39: The composition of any of Embodiments 34-38, wherein the aliphatic ester units of the copolymer have a length of from 8 to 12 carbon atoms.

Embodiment 40: The composition of any of Embodiments 34-39, wherein the poly(aliphatic ester)-polycarbonate copolymer contains about 6 mol % of aliphatic ester units derived from sebacic acid and contains polycarbonate units derived from bisphenol-A.

Embodiment 41: The composition of any of Embodiments 34-40, further comprising a polycarbonate polymer.

Embodiment 42: The composition of any of Embodiments 34-41, further comprising a hydrolytic stabilizer.

Embodiment 43: An optical waveguide, comprising: a poly(aliphatic ester)-polycarbonate copolymer having a weight average molecular weight of from about 15,000 to about 25,000, the weight average molecular weight being controlled by chain-chopping chemistry, and wherein the copolymer has a melt flow rate measured according to ASTM D1238 (300° C., 1.2 kgf) of at least 100 g/10 min.

Embodiment 44: The optical waveguide of Embodiment 43, further comprising a polycarbonate that is not a poly(aliphatic ester)-polycarbonate.

Embodiment 45: The optical waveguide of any of Embodiments 43-44, wherein the optical waveguide has a wall thickness of less than 0.5 mm.

Embodiment 46: The optical waveguide of any of Embodiments 43-45, wherein the optical waveguide has a wall thickness of less than 0.3 mm.

Embodiment 47: The optical waveguide of any of Embodiments 43-46, wherein the poly(aliphatic ester)-polycarbonate copolymer has a weight average molecular weight of from about 16,000 to about 18,000.

Embodiment 48: The optical waveguide of any of Embodiments 43-46, wherein the poly(aliphatic ester)-polycarbonate copolymer has a glass transition temperature of at least 130° C.

Embodiment 49: The optical waveguide of any of Embodiments 43-48, wherein the poly(aliphatic ester)-polycarbonate copolymer contains about 6.0 mol % of aliphatic ester units.

Embodiment 50: The optical waveguide of Embodiment 49, wherein the aliphatic ester units are derived from sebacic acid.

Embodiment 51: The optical waveguide of any of Embodiments 43-49, wherein the aliphatic ester units of the copolymer have a length of from 8 to 12 carbon atoms.

Embodiment 52: The optical waveguide of any of Embodiments 43-51, wherein the poly(aliphatic ester)-polycarbonate copolymer contains about 6 mol % of aliphatic ester units derived from sebacic acid and contains polycarbonate units derived from bisphenol-A.

Embodiment 53: A device comprising the optical waveguide of any of Embodiments 43-52.

Embodiment 54: The device of Embodiment 53, wherein the device is a liquid crystal display, a television, or a computer monitor screen.

Embodiment 55: An optical waveguide having a wall thickness of less than 0.3 mm.

Embodiment 56: The optical waveguide of Embodiment 55, wherein the optical waveguide comprises a poly(aliphatic ester)-polycarbonate copolymer having a weight average molecular weight of from about 15,000 to about 25,000, Embodiment 57: The optical waveguide of Embodiment 56, wherein the poly(aliphatic ester)-polycarbonate copolymer has a weight average molecular weight of from about 16,000 to about 18,000.

Embodiment 58: The optical waveguide of any of Embodiments 55-57, wherein the poly(aliphatic ester)-polycarbonate copolymer has a glass transition temperature of greater than 130° C.

Embodiment 59: The optical waveguide of any of Embodiments 55-58, wherein the copolymer has a melt flow rate measured according to ASTM D1238 (300° C., 1.2 kgf) of at least 100 g/10 min.

Embodiment 60: The optical waveguide of any of Embodiments 55-59, wherein the poly(aliphatic ester)-polycarbonate copolymer contains about 6.0 mol % of aliphatic ester units.

Embodiment 61: The composition of Embodiment 60, wherein the aliphatic ester units are derived from sebacic acid.

Embodiment 62: The optical waveguide of Embodiment 55-60, wherein the aliphatic ester units of the copolymer have a length of from 8 to 12 carbon atoms.

Embodiment 63: The optical waveguide of any of Embodiments 55-62, wherein the poly(aliphatic ester)-polycarbonate copolymer contains about 6 mol % of aliphatic ester units derived from sebacic acid and contains polycarbonate units derived from bisphenol-A.

Embodiment 64: A device comprising the optical waveguide of any of Embodiments 55-63, and Embodiment 97.

Embodiment 65: The device of Embodiment 64, wherein the device is a liquid crystal display, a television, or a computer monitor screen.

Embodiment 66: An optical waveguide comprising (A) a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min, the optical waveguide being made of a tabular molding and having a light-scattering layer formed directly on the face or back.

Embodiment 67: The optical waveguide of Embodiment 66, wherein the aliphatic ester units in the copolymer are derived from a polymethylene-dicarboxylic acid, and the ratio of the polymethylene-dicarboxylic acid falls between 1 and 30 mol % of the monomer that constitutes the polycarbonate units.

Embodiment 68: The optical waveguide of Embodiment 66-67, wherein the light-scattering layer has a microprism structure.

Embodiment 69: A method for producing the optical waveguide of Embodiment 66-68, in which, when a tabular molding for it is injection-molded, a microprism structure that serves as a light-scattering layer is transferred onto its face or back with a stamper.

Embodiment 70: The optical waveguide of Embodiment 66-68, wherein the microprism structure is a regular tetrahedral structure.

Embodiment 71: A method for producing the optical waveguide of Embodiment 70, in which, when a tabular molding for it is injection-molded, a microprism structure that serves as a light-scattering layer is transferred onto its face or back with a stamper.

Embodiment 72: The optical waveguide of Embodiment 70, wherein the regular tetrahedral structure has a height falling between 10 and 300 μm.

Embodiment 73: The optical waveguide of any of Embodiments 66-72, wherein the poly(aliphatic ester)-polycarbonate copolymer contains about 6.0 mol % of aliphatic ester units derived from sebacic acid.

Embodiment 74: The optical waveguide of any of Embodiments 66-73, wherein the poly(aliphatic ester)-polycarbonate copolymer has a weight average molecular weight of from about 16,000 to about 18,000.

Embodiment 75: The optical waveguide of any of Embodiments 66-74, wherein the poly(aliphatic ester)-polycarbonate copolymer has a glass transition temperature of greater than 130° C.

Embodiment 76: The optical waveguide of any of Embodiments 66-75, wherein the optical waveguide has a notched Izod impact strength of at least 550 J/m when measured according to ASTM D256 at 23° C.

Embodiment 77: The optical waveguide of any of Embodiments 66-75, wherein the optical waveguide has a ductility of 100% when measured according to ASTM D256 at 23° C.

Embodiment 78: The optical waveguide of any of Embodiments 66-75, wherein the optical waveguide has an impact energy at peak of at least 50 J, when measured according to ASTM D3763 at 23° C.

Embodiment 79: The optical waveguide of any of Embodiments 66-78, wherein the optical waveguide has a wall thickness of less than 0.5 mm.

Embodiment 80: The optical waveguide of any of Embodiments 66-78, wherein the optical waveguide has a wall thickness of less than 0.3 mm.

Embodiment 81: The optical waveguide of any of Embodiments 66-80, wherein the optical waveguide has at least 85% light transmission when measured according to ASTM D1003 at 3.2 mm thickness.

Embodiment 82: The optical waveguide of any of Embodiments 66-81, wherein the optical waveguide has less than 1% haze when measured according to ASTM D1003 at 3.2 mm thickness.

Embodiment 83: The optical waveguide of any of Embodiments 66-82, wherein the poly(aliphatic ester)-polycarbonate copolymer contains about 6 mol % of aliphatic ester units derived from sebacic acid and contains polycarbonate units derived from bisphenol-A.

Embodiment 84: The optical waveguide of any of Embodiments 66-83, further comprising a polycarbonate polymer.

Embodiment 85: The optical waveguide of any of Embodiments 66-83, further comprising a hydrolytic stabilizer.

Embodiment 86: The optical waveguide of any of Embodiments 66-85, wherein the optical waveguide does not contain an acrylic resin.

Embodiment 87: The optical waveguide of any of Embodiments 66-86, wherein the optical waveguide has a melt flow rate measured according to ASTM D1238 (300° C., 1.2 kgf) of at least 100 g/10 min; a notched Izod impact strength of at least 550 J/m when measured according to ASTM D256 at 23° C.; and at least 85% light transmission when measured according to ASTM D1003 at 3.2 mm thickness.

Embodiment 88: The optical waveguide of any of Embodiments 66-86, wherein the optical waveguide has a melt flow rate measured according to ASTM D1238 (300° C., 1.2 kgf) of at least 100 g/10 min; a notched Izod impact strength of at least 570 J/m when measured according to ASTM D256 at 23° C.; at least 85% light transmission when measured according to ASTM D1003 at 3.2 mm thickness; and an impact energy at peak of at least 50 J, when measured according to ASTM D3763 at 23° C.

Embodiment 89: The optical waveguide of any of Embodiments 66-88, wherein the optical waveguide has a glass transition temperature of from 110° C. to 145° C. and a weight average molecular weight of from about 16,000 to about 18,000.

Embodiment 90: A method for producing the optical waveguide of Embodiment 72-89, in which, when a tabular molding for it is injection-molded, a microprism structure that serves as a light-scattering layer is transferred onto its face or back with a stamper.

Embodiment 91: A device, comprising: the optical waveguide of Embodiment 66-89 and a light source.

Embodiment 92: A method of scattering light, which comprises: illuminating a surface of the optical waveguide of Embodiment 66-89 with a light and directing the light through the light-scattering layer.

Embodiment 93: The optical waveguide of any of Embodiments 1-19 further comprising a polycarbonate that is not a poly(aliphatic ester)-polycarbonate.

Embodiment 94: The optical waveguide of any of Embodiments 22-24, wherein the poly(aliphatic ester)-polycarbonate copolymer contains about 6 mol % of aliphatic ester units derived from sebacic acid and contains polycarbonate units derived from bisphenol-A.

Embodiment 95: The optical waveguide of any of Embodiments 22-24 further comprising a polycarbonate that is not a poly(aliphatic ester)-polycarbonate.

Embodiment 96: The optical waveguide of any of Embodiments 27-33, wherein the poly(aliphatic ester)-polycarbonate copolymer contains about 6 mol % of aliphatic ester units derived from sebacic acid and contains polycarbonate units derived from bisphenol-A.

Embodiment 97: The optical waveguide of any of Embodiments 55-63 further comprising a polycarbonate that is not a poly(aliphatic ester)-polycarbonate.

Embodiment 98: The optical waveguide of any of Embodiments 1-97, wherein said poly(aliphatic ester)-polycarbonate copolymer contains less than 8 mol % of aliphatic ester units derived from sebacic acid.

Embodiment 99: The optical waveguide of any of Embodiments 1-97, wherein said poly(aliphatic ester)-polycarbonate copolymer contains less than 8 mol % of aliphatic ester units.

Embodiment 100: The optical waveguide of any of Embodiments 1-97, wherein said poly(aliphatic ester)-polycarbonate copolymer contains about 6 mol % of aliphatic ester units.

The following examples are provided to illustrate the poly(aliphatic ester)-polycarbonate copolymers, optical waveguides, and methods of the present disclosure. The examples are merely illustrative and are not intended to limit the disclosure to the materials, conditions, or process parameters set forth therein.

EXAMPLES

Table 1 lists the names and descriptions of the ingredients used in the following Examples.

TABLE 1

| Ingredient | Description | Mw | Trade name | Supplier |
|---|---|---|---|---|
| PAEBPA | Sebacic acid-bisphenol A copolymer, 6.0 mol % sebacic acid, PCP (p-cumylphenol) endcapped | 21,500 | LEXAN | SABIC Innovative Plastics |
| PC-1 | Bisphenol A homopolymer, PCP (p-cumylphenol) endcapped | 17,000 | LEXAN | SABIC Innovative Plastics |
| PC-2 | Bisphenol A homopolymer, PCP (p-cumylphenol) endcapped | 15,000 | LEXAN | SABIC Innovative Plastics |
| PETS | Pentaerythritol tetrastearate, >90% esterified, mold release agent | | | Asia Pacific PTE Ltd. |
| Joncryl | Chain extender, epoxy | ~6,800 | JONCRYL | BASF |
| Phosphites | Stabilizers | | Irgafos | Ciba |
| TBPH | Tetrabutyl phosphonium hydroxide, 45% solution in water | | | SACHEM Americas |

Two Comparative Examples C1, C2, and one Example E1 were made. The compositions in question were made using a 30 mm co-rotating twin screw (Werner & Pfleiderer; ZSK-30) extruder using a melt temperature of 300° C. with a throughput of 20 kg/hr, 20 inches of mercury vacuum and a screw speed of 400 RPM. The TBPH solution was fed into the extruder using a separate liquid pump feeder. The extrudate was cooled under water, pelletized and dried at 120° C. for 4 hours with a desiccant bed dryer. To make test specimens, the dried pellets were injection molded using a Van Dorn 80T molding machine at 300° C. melt temperature to form test parts for impact and mechanical testing.

The tensile modulus and the stress and strain values were measured according to ASTM D638. All values were measured at 0.2 inches/minute.

The notched Izod impact strength (NII) and ductility were measured using ASTM D256, 5 lbf weight, 23° C., and 3.2 mm thickness.

The impact energy at peak was measured according to ASTM D3763 at 23° C.

The specific gravity was measured according to ASTM D792.

The MFR was measured according to ASTM D1238 at 1.2 kgf at a temperature of either 300° C. or 250° C.

The heat deflection temperature (HDT) was measured according to ASTM D648 with an unannealed bar of 3.2 mm thickness at either 0.45 MPa or 1.82 MPa. An HDT of at least 90° C. (0.45 MPa, 3.2 mm) is generally desirable.

The light transmission and haze were measured according to ASTM D1003 at 3.2 mm thickness.

The formulations and resulting measured properties are shown in Table 2 below. The notation "**" was used when the material was too brittle and test bars could not be molded without cracking/shattering.

TABLE 2

| Ingredient | Unit | C1 | C2 | E1 |
|---|---|---|---|---|
| PAEBPA | phr | 0 | 0 | 100 |
| PC-1 | phr | 100 | 0 | 0 |
| PC-2 | phr | 0 | 100 | 0 |
| Phosphites | phr | 0.06 | 0.06 | 0.06 |
| PETS | phr | 0.20 | 0.20 | 0.20 |
| Joncryl | phr | 0.10 | 0.10 | 0.10 |
| TBPH | phr | 0 | 0 | 0.029 |
| Tensile Modulus | MPa | 2390 | ** | 2340 |
| Tensile Stress, yield, Type 1 | MPa | 59 | ** | 53 |
| Tensile Stress, break, Type 1 | MPa | 52 | ** | 52 |
| Tensile Strain, yield, Type 1 | % | 5.5 | ** | 5.5 |
| Tensile Strain, break, Type 1 | % | 83 | ** | 101 |
| NII, 23° C. | J/m | 500 | ** | 596 |
| Ductility, 23° C. | % | 20 | ** | 100 |

TABLE 2-continued

| Ingredient | Unit | C1 | C2 | E1 |
|---|---|---|---|---|
| Impact Energy @ peak, 23° C. | J | 34 | ** | 62 |
| Instrumented impact % ductility, 23° C. | % | 60 | ** | 100 |
| Specific Gravity | — | 1.20 | 1.20 | 1.20 |
| Melt Flow Rate, 300° C. | g/10 min | 65 | 100 | 100 |
| Melt Flow Rate, 250° C. | g/10 min | 11 | 19 | 19 |
| HDT, 0.45 MPa | ° C. | 135 | ** | 117 |
| HDT, 1.82 MPa | ° C. | 124 | ** | 103 |
| Light Transmission | % | 89 | ** | 89 |
| Haze | % | <1 | ** | <1 |

It should be noted that the final weight average molecular weight of the PAEBPA in E1 was about 17,000 (due to chain-chopping chemistry). The Tg of the PAEBPA prior to extrusion was about 135° C.

Initially, the MFR for C1 is too low to fill molds having a thickness of less than 0.5 mm. In addition, E1 had better NII compared to C1. C2 was not able to form parts with sufficient impact strength; they were too brittle even to be tested.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An optical waveguide, comprising:
a poly(aliphatic ester)-polycarbonate copolymer having a weight average molecular weight of from about 15,000 to about 25,000 and a melt flow rate measured according to ASTM D1238 (300° C., 1.2 kgf) of at least 100 g/10 min, wherein the optical waveguide has a wall thickness of less than 0.5 mm, and wherein the optical waveguide includes a textured light-diffracting layer having a thickness of less than 10 microns.

2. The optical waveguide of claim 1, wherein the poly(aliphatic ester)-polycarbonate copolymer contains about 6.0 mol % of aliphatic ester units derived from sebacic acid.

3. The optical waveguide of claim 1, wherein the poly(aliphatic ester)-polycarbonate copolymer has a weight average molecular weight of from about 16,000 to about 18,000.

4. The optical waveguide of claim 1, wherein the poly(aliphatic ester)-polycarbonate copolymer has a glass transition temperature of greater than 130° C. or between 110° C. and 145° C.

5. The optical waveguide of claim 1, wherein the optical waveguide has a notched Izod impact strength of at least 550 J/m when measured according to ASTM D256 at 23° C.

6. The optical waveguide of claim 1, wherein the optical waveguide has a ductility of 100% when measured according to ASTM D256 at 23° C.

7. The optical waveguide of claim 1, wherein the optical waveguide has an impact energy at peak of at least 50 J, when measured according to ASTM D3763 at 23° C.

8. The optical waveguide of claim 1, wherein the optical waveguide has a wall thickness of less than 0.3 mm.

9. The optical waveguide of claim 1, wherein the optical waveguide has at least 85% light transmission when measured according to ASTM D1003 at 3.2 mm thickness.

10. The optical waveguide of claim 1, wherein the optical waveguide has less than 1% haze when measured according to ASTM D1003 at 3.2 mm thickness.

11. The optical waveguide of claim 1, wherein the poly(aliphatic ester)-polycarbonate copolymer contains about 6 mol % of aliphatic ester units derived from sebacic acid and contains polycarbonate units derived from bisphenol-A.

12. The optical waveguide of claim 1, wherein the optical waveguide has a melt flow rate measured according to ASTM D1238 (300° C., 1.2 kgf) of at least 100 g/10 min; a notched Izod impact strength of at least 550 J/m when measured according to ASTM D256 at 23° C.; and at least 85% light transmission when measured according to ASTM D1003 at 3.2 mm thickness.

13. The optical waveguide of claim 1, wherein the optical waveguide has a notched Izod impact strength of at least 570 J/m when measured according to ASTM D256 at 23° C.; at least 85% light transmission when measured according to ASTM D1003 at 3.2 mm thickness; and an impact energy at peak of at least 50 J, when measured according to ASTM D3763 at 23° C.

14. The optical waveguide of claim 1, wherein the optical waveguide has a glass transition temperature of greater than 130° C. and a weight average molecular weight of from about 16,000 to about 18,000.

15. A device comprising the optical waveguide of claim 1.

16. The device of claim 15, wherein the device is a liquid crystal display, a television, or a computer monitor screen.

17. The optical waveguide of claim 1 wherein the poly(aliphatic ester)-polycarbonate copolymer has a notched Izod impact strength of at least 570 J/m when measured according to ASTM D256 at 23° C.; and an impact energy at peak of at least 50 J, when measured according to ASTM D3763 at 23° C.;
wherein a surface of the optical waveguide includes a textured light-diffracting layer having a thickness of less than 10 microns.

18. A method of making an optical waveguide, comprising:
injecting a poly(aliphatic ester)-polycarbonate copolymer into an injection mold, wherein the poly(aliphatic ester)-polycarbonate copolymer has a weight average molecular weight of from about 15,000 to about 25,000 and a melt flow rate measured according to ASTM D1238 (300° C., 1.2 kgf) of at least 100 g/10 min, and wherein the injection mold includes a textured surface on an interior surface; and
curing the copolymer in the injection mold to form an optical waveguide with a textured light-diffracting layer derived from the textured surface; and
removing the optical waveguide from the injection mold, wherein the optical waveguide has a wall thickness of less than 0.5 mm, and wherein the optical waveguide includes a textured light-diffracting layer having a thickness of less than 10 microns.

19. The method of claim 18, wherein the copolymer in the optical waveguide has a weight average molecular weight of about 17,000 during the injection.

20. The method of claim 18, wherein the weight average molecular weight of the copolymer in the optical waveguide is controlled by chain-chopping prior to injection into the injecting mold.

21. The method of claim 20, wherein the chain-chopping is performed by treating the copolymer with a redistribution catalyst.

22. The method of claim 21, wherein the redistribution catalyst is a tetraalkylphosphonium hydroxide, tetraalkylphosphonium alkoxide, tetraalkylphosphonium aryloxide, a tetraalkylphosphonium carbonate, a tetraalkylammonium hydroxide, a tetraalkylammonium carbonate, a tetraalkylammonium phosphite, a tetraalkylammonium acetate, or a combination thereof, wherein each alkyl independently contains 1 to 6 carbon atoms.

23. The method of claim 22, wherein the redistribution catalyst is tetra-n-butylphosphonium hydroxide.

24. The method of claim 21, wherein the redistribution catalyst is used in the amount of 400 ppm by weight or less based on the weight of the poly(aliphatic ester)-polycarbonate copolymer.

25. The optical waveguide of claim 1, the optical waveguide being made of a tabular molding and having a light-scattering layer formed directly on the face or back.

26. The optical waveguide of claim 25, wherein the aliphatic ester units in the copolymer are derived from a polymethylene-dicarboxylic acid, and the ratio of the polymethylene-dicarboxylic acid falls between 1 and 30 mol % of the monomer that constitutes the polycarbonate units.

27. The optical waveguide of claim 25, wherein the light-scattering layer has a microprism structure.

28. A method for producing the optical waveguide of claim 25, in which, when a tabular molding for it is injection-molded, a microprism structure that serves as a light-scattering layer is transferred onto its face or back with a stamper.

29. The optical waveguide of claim 25, wherein the microprism structure is a regular tetrahedral structure.

30. The optical waveguide of claim 29, wherein the regular tetrahedral structure has a height falling between 10 and 300 μm.

31. The optical waveguide of claim 1, further comprising a hydrolytic stabilizer.

32. The optical waveguide claim 1, wherein the optical waveguide does not contain an acrylic resin.

33. A device, comprising: the optical waveguide of claim 25 and a light source.

34. A method of scattering light, which comprises: illuminating a surface of the optical waveguide of claim 25 with a light and directing the light through the light-scattering layer.

35. The optical waveguide of claim 1 further comprising a polycarbonate that is not a poly(aliphatic ester)-polycarbonate.

36. The optical waveguide of claim 1, wherein the poly(aliphatic ester)-polycarbonate copolymer contains about 6 mol % of aliphatic ester units derived from sebacic acid and contains polycarbonate units derived from bisphenol-A.

37. The optical waveguide of claim 1, wherein said poly(aliphatic ester)-polycarbonate copolymer contains less than 8 mol % of aliphatic ester units derived from sebacic acid.

* * * * *